United States Patent [19]

Favalora

[11] Patent Number: 5,390,968
[45] Date of Patent: Feb. 21, 1995

[54] FLAT ELBOW/ONE DIRECTION TEE FITTING

[75] Inventor: Mark L. Favalora, Nianti, Conn.

[73] Assignee: Hubbell Incorporated, Orange, Conn.

[21] Appl. No.: 106,858

[22] Filed: Aug. 16, 1993

[51] Int. Cl.$^6$ ............................................. F16L 27/00
[52] U.S. Cl. ................................... 285/179; 285/127; 403/205; 403/3; 174/68.3
[58] Field of Search ............. 285/4, 12, 127, 179; 403/3, 6, 205, 206; 174/68.3, 71 R, 72 C, 95

[56] References Cited

U.S. PATENT DOCUMENTS

| | | | |
|---|---|---|---|
| 1,528,252 | 3/1925 | House | 285/127 |
| 1,669,447 | 5/1928 | Boyton et al. | 285/127 |
| 1,681,097 | 8/1928 | Church | 285/127 |
| 1,861,314 | 5/1932 | McAndrew | 285/127 |
| 2,790,653 | 4/1957 | Murphy | 174/72 C |
| 4,951,716 | 8/1990 | Tsunoda et al. | 174/68.3 |
| 5,161,580 | 11/1992 | Klug | 174/68.3 |

Primary Examiner—John T. Kwon
Assistant Examiner—Michael S. Lee
Attorney, Agent, or Firm—Jerry M. Presson; Frederick J. Haesche

[57] ABSTRACT

A flat elbow/one direction tee fitting having a hollow generally L-shaped body including a pair of angularly spaced apart legs joined at a corner and partially defined by rectilinearly extending outer sidewalls and an arcuate inner sidewall. Each of the two legs has a raceway receiving opening at its free end. The corner defines a knockout which is removeable to form a third raceway receiving opening. The body is defined by a mounting base and a cover releasably retained in snap together assembly with the mounting base.

22 Claims, 3 Drawing Sheets

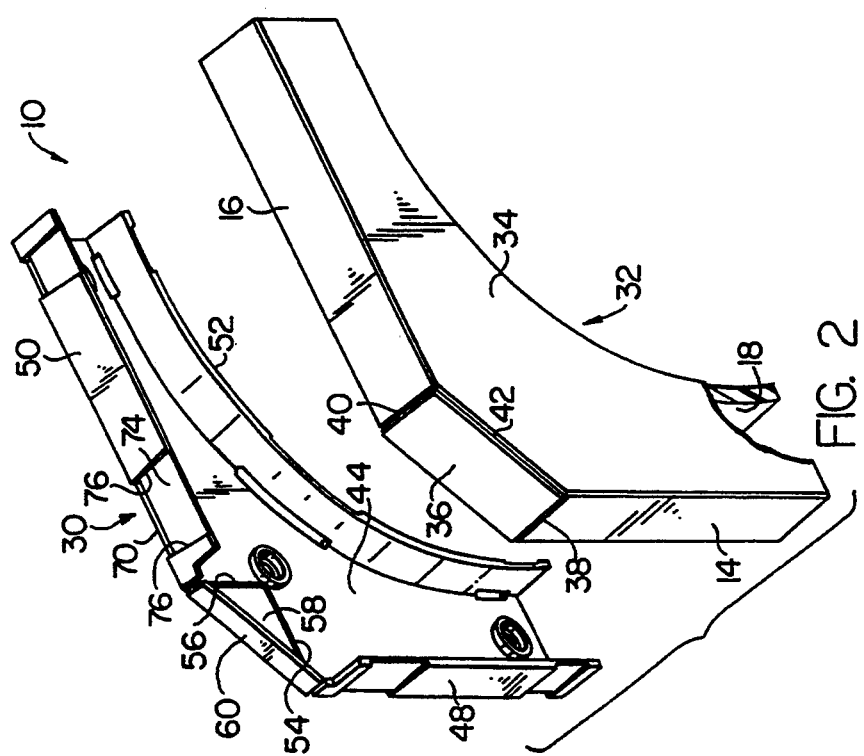
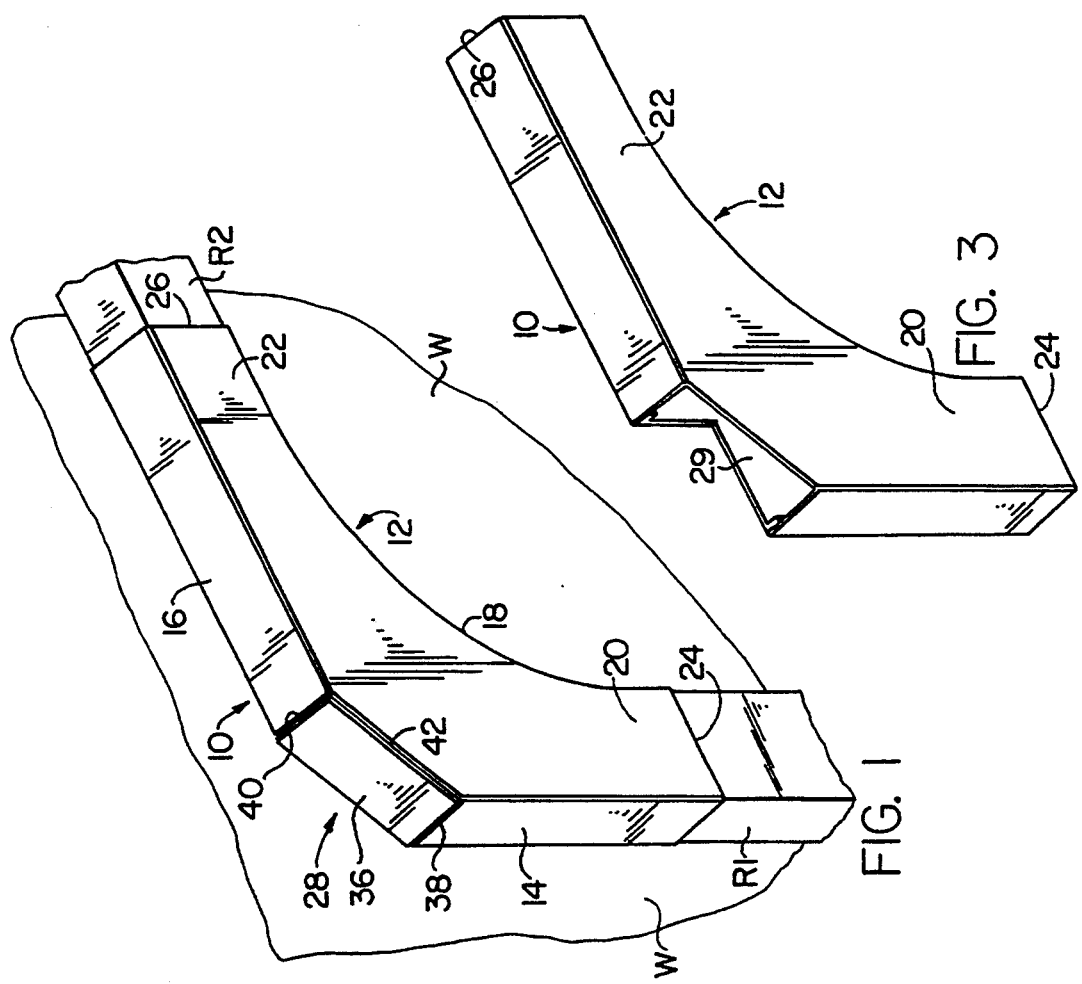

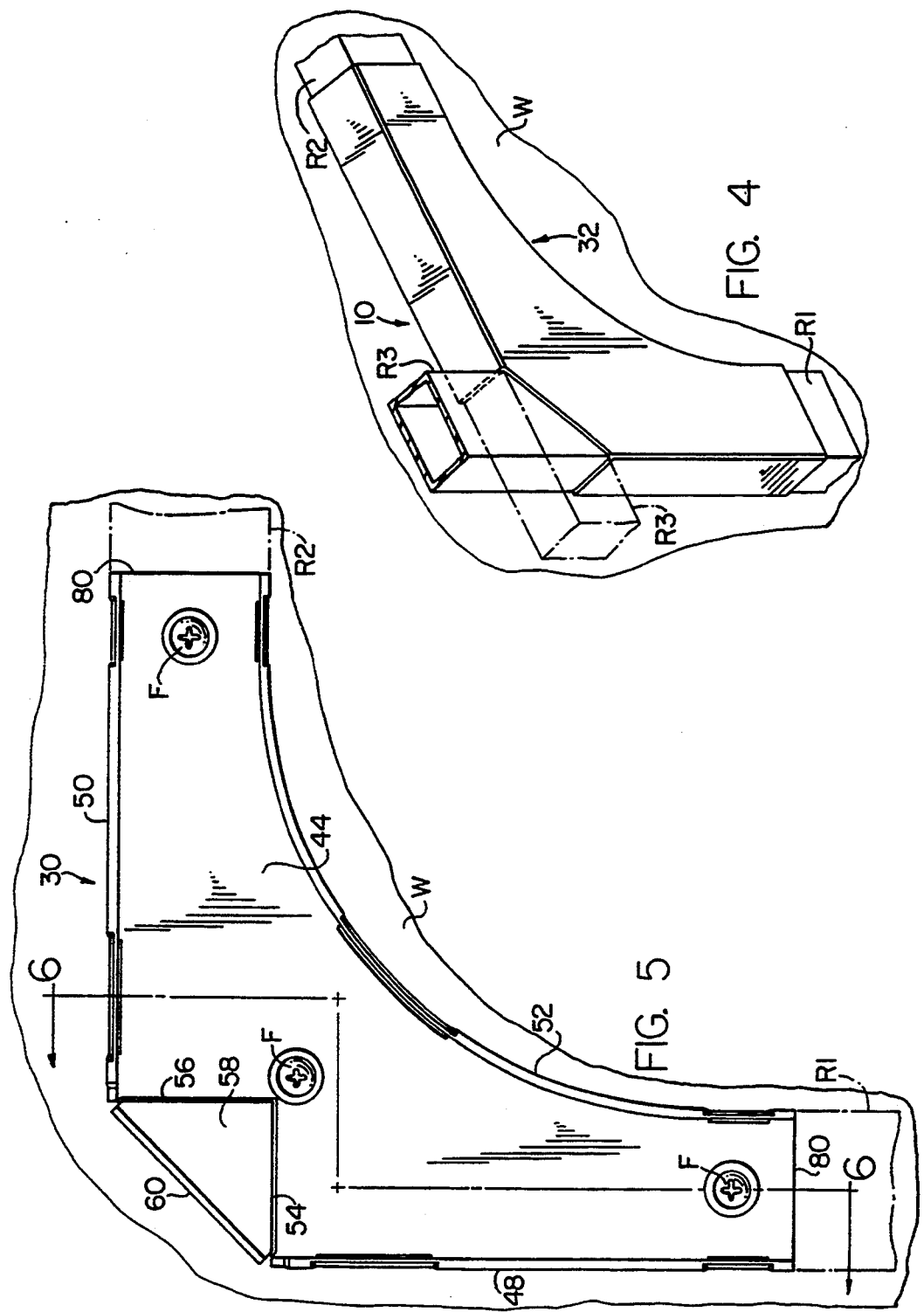

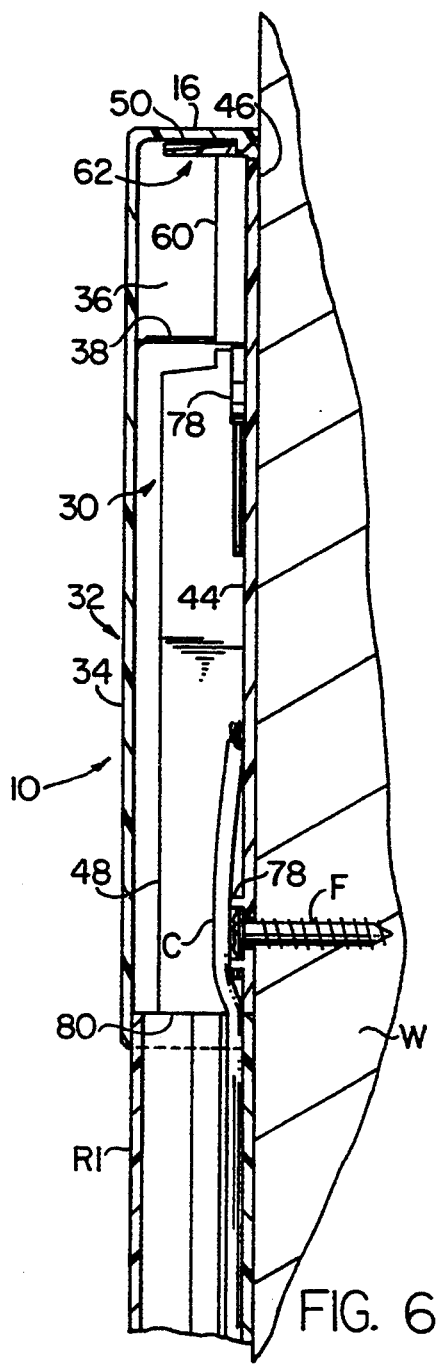
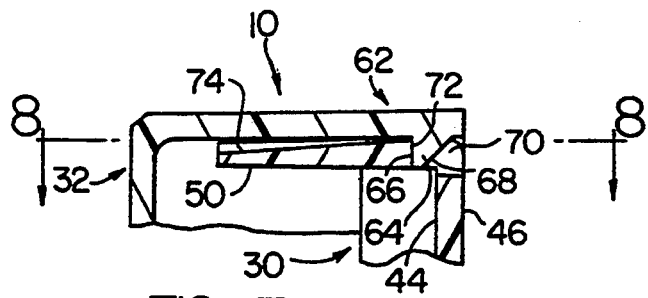
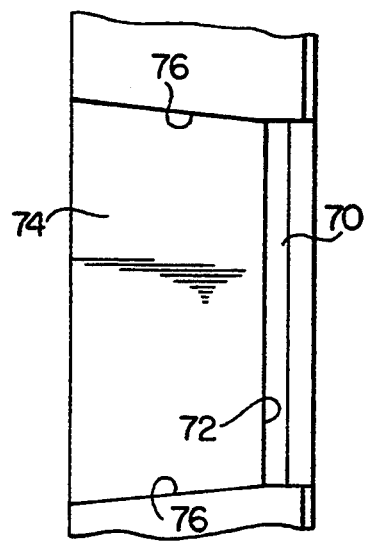

FLAT ELBOW/ONE DIRECTION TEE FITTING

BACKGROUND OF THE INVENTION

This invention relates in general to fittings for surface mounted raceways and deals more particularly with an improved dual purpose fitting for a surface raceway system.

Surface raceway systems for mounting on walls and/or ceilings to route, contain and protect wires and cables are well known in the art. The manufacturer of such a raceway system must provide a variety of fittings, including elbows and tees, to accommodate the requirements imposed by different room shapes and service access problems. In addition to the fittings specified for a given raceway system, the installation contractor must also maintain a relatively large inventory of various extra fittings at the job site to overcome unanticipated problems which inevitably occur during system installation in bringing service from one location to another. The lack of an appropriate fitting required to solve an unanticipated cable routing problem can result in expensive downtime.

Accordingly, it is the general aim of the present invention to provide a versatile dual purpose raceway fitting which may serve as either a flat elbow or a one direction tee and which may be mounted in any one of a plurality of possible requirements. A further aim of the invention is to provide a dual purpose fitting which may be used to route, contain and protect power cable, telecommunication cable or fiber optic cable.

SUMMARY OF THE INVENTION

In accordance with the present invention a flat elbow/one direction tee fitting is provided which comprises a hollow generally L-shaped body having a pair of axially elongate angularly spaced apart legs. Each of the legs has a raceway receiving opening at its free end which communicates with the interior of the body for receiving an end portion of an associated raceway. The fitting body has knockout means for breakaway separation from the remainder of the body to define a third raceway receiving opening which adapts the fitting for use as a one direction tee. The third raceway receiving opening communicates with the interior of the body to receive a third raceway in one position wherein the third raceway extends from the third raceway receiving opening and in a direction of axial extent of one of the legs and in another position wherein third the raceway extends from the third raceway receiving opening and in a direction of axial extent of the other of the legs.

BRIEF DESCRIPTION OF THE DRAWINGS

FIG. 1 is a perspective view of a flat elbow/one direction tee fitting embodying the present invention and shown used as a flat elbow in a wall mounted raceway system.

FIG. 2 is an exploded perspective view of the fitting shown in FIG. 1.

FIG. 3 is a perspective view of the assembled fitting with the knockout removed for use as a one direction tee.

FIG. 4 is similar to FIG. 1 but shows the fitting used as a one direction tee, an alternate raceway position being indicated by broken lines.

FIG. 5 is a somewhat enlarged front elevational view of the fitting base member shown in FIGS. 1 and 2, the mounting positions of associated raceways being indicated by broken lines.

FIG. 6 is a sectional view taken generally along the line 6—6 of FIG. 5 and shows the base member secured to a mounting surface with the cover attached thereto and a raceway received in the fitting.

FIG. 7 is a somewhat further enlarged fragmentary sectional view of the cover latch mechanism shown in FIG. 5.

FIG. 8 is a fragmentary view of the mounting base as viewed along the line 8—8 of FIG. 7.

DETAILED DESCRIPTION OF PREFERRED EMBODIMENT

Turning now to the drawings, a flat elbow/one direction tee fitting embodying the present invention is indicated generally by the reference 10. The illustrated fitting 10 is a dual purpose fitting particularly adapted for use in a surface mounted raceway system to route, contain and protect one or more cables, such as the cable C shown in FIG. 6, and may serve in such a system as either an elbow or a one direction tee. As shown in FIG. 1 the fitting 10 comprises an elbow in a surface raceway system mounted on a flat wall surface designed by the letter W. The elbow provides connection between a vertically oriented raceway R1 and a horizontally oriented raceway R2.

The illustrated fitting 10 has a hollow generally L-shaped body designated generally by the reference numeral 12 and includes rectilinear outer sidewalls 14 and 16 and an inner sidewall 18 which has a generally arcuate configuration for a purpose which will be hereinafter discussed. The inner and outer sidewalls cooperate to partially define axially elongate and angularly spaced part first and second legs indicated at 20 and 22. The free ends of the legs 20 and 22 respectively define first and second raceway receiving openings 24 and 26 which communicate the interior of the fitting 10 to receive associated end portions of the illustrated raceways R1 and R2.

Further, and in accordance with the invention, the body 12 has a knockout indicated generally at 28 for breakaway separation from the remainder of the body to define a third raceway receiving opening 29 which adapts the fitting for use as a one direction tee, all of which will be hereinafter further discussed.

The body of the fitting may be made from any suitable material. However, the illustrated fitting 10 has a body 12 which is molded from a resilient polyvinyl chloride polymer.

The legs 20 and 22 are arranged in perpendicular relation to each other and the arcuate portion of the inner sidewall 18 has a center of curvature which lies along a line (not shown) which bisects the interior angle between the two legs. The fitting 10 is preferably formed from two parts, as best shown in FIG. 2, and includes a mounting base or base member indicated generally at 30 and a removeable cover designated generally by the numeral 32.

As oriented in the drawings the cover 32 has a front wall 34 and is open at its rear to receive the base member 30. The rectilinear outer sidewalls 14 and 16 and the arcuate inner sidewall 18 extend rearwardly from the front wall 34, substantially as shown. The cover further includes a corner sidewall 36 which is inclined relative to and extends between the sidewalls 14 and 16 as shown in FIG. 1. The corner sidewall 36 which comprises a part of the knockout 28 is connected to the cover sidewalls 14 and 16 and to the front wall 34 along lines of weakening respectively indicated at 38, 40 and 42, to facilitate breakaway separation from the remainder of the cover 32 for a purpose which will be hereinafter further evident.

The generally L-shaped mounting base 30 is received in assembly within and substantially complements the rearwardly open cover 32. The base member has a rear wall 44 which defines a substantially planar rearwardly facing mounting surface 46, best shown in FIG. 6. Outer sidewalls 48 and 50 and an arcuate inner sidewall 52 extend along associated peripheral edge portions of the rear wall 44 and project forwardly from it, as best shown in FIG. 2.

The knockout 28 is further defined by a part of the base member 30 and more specifically by a removable part of the rear wall 44. Lines of weakening 54 and 56 molded into or otherwise formed on the rear wall 44 define the generally triangularly shaped removable part of the rear wall the latter part being indicated at 58 and shown in FIG. 2. A tab 60 integrally connected to the removable part 58 projects forwardly from it, extends generally between the sidewalls 48 and 50 and forms a removable sidewall at the corner of the base member 30.

The resilient cover 32 is releasably secured in snap together latching assembly with the base member 30 and for this reason the fitting 10 has a plurality of latching mechanisms. The latching mechanism may vary in arrangement and number. However, in the present embodiment seven such latching mechanisms which are identical in function but differ somewhat in size serve to releasably retain the cover 32 in assembly with the base member 30.

A typical latching mechanism is shown in FIGS. 6 and 7 and indicated generally by the reference numeral 62. The illustrated latching mechanism 62 includes a latch element 64 integrally formed on the inner side of the cover outer sidewall 16 proximate the rear edge of the sidewall. The latch element 64 has a forwardly facing abutment surface 66 and a rearwardly and outwardly inclined cam surface 68, best shown in FIG. 7. A latch receiving opening 70 formed in the base member 30 and partially defined by the rear wall 44 and the sidewall 50 has a rearwardly facing abutment surface 72. A rearwardly and outwardly inclined latch receiving groove 74 formed in the sidewall 50 and best shown in FIGS. 6 and 7, has opposing walls indicated at 76, 76 (FIG. 8) which diverge from the forward end of the wall 50 to the latch receiving opening 70, substantially as shown. The latch elements cooperate with the latch receiving grooves to guide the cover into and maintain the cover 32 in alignment with the base member 30 as the cover is moved into assembly with the base member.

A plurality of mounting apertures in the rear wall 44 receive the fasteners used to secure the fitting 10 to an associated wall surface of the like such as shown in FIG. 5. A forwardly projecting annular collar 78 is integrally formed in the rear wall in surrounding relation with each of the fastener receiving openings to receive the head of an associated fastener F, as shown in FIGS. 5 and 6.

When the fitting 10 is used as an elbow in a surface mounted raceway system, the base member 30 with the knockout part 58 attached is secured to a wall or other flat mounting surface such as the wall W so that the ends of the mounting base, indicated at 80, 80 in FIG. 5, abut the ends of the raceways $R_1$ and $R_2$ or at least the base portions of the later raceways. When the raceway system is used to route fiber optical cable the arcuate inner wall 52 permits a large radius to be maintained in the fiber optic cable as the cable. This large radius protects the glass fibers within the cable from being broken or loosing signal (light) which must be transmitted by the cable around the 90 degree arc formed by the elbow. After one or more cables C have been positioned in the raceways and $R_1$ and $R_2$ and in the elbow fitting 10, the resilient cover 32 is snapped into place on the base member 30 to complete the elbow assembly. It will be noted that the ends of the legs 20 and 22 on the cover extend for some distance beyond the base member ends 80, 80 and conceal the junctions between the abutting ends of the raceways R1 and R2 and the base member ends 80,80. The concealed junction between the end of the raceway R1 and the base member end 80 is shown in FIG. 6.

When the fitting 10 is to be used as a one direction tee, the knockout 28 is first separated from the fitting before the fitting is installed. The base part 58 and the attached tab 60 is first broken away from the base member 30 along the lines of weakening 54 and 56 relative to the fitting 10. The corner wall 36 is also broken away from the cover 32. The base member 30 is then fastened to an associated wall or other flat mounting surface such as the wall W so that the ends 80, 80 abut the ends of the first and second raceways R1 and R2. A third raceway R3 or at least the base of the third raceway is next positioned in one of two possible positions in abutting engagement with the edges 54 and 56 formed on the base member rear wall 44 by removal of the rear wall portion 58. The third raceway R3 may be mounted in either of two mounting position, relative to the fitting 10. In one position the third raceway R3 is in axial alignment with a direction of axial extent of the first raceway R1 as shown in full lines in FIG. 4. In its other mounting position shown in broken lines it is in axial alignment with a direction of axial extent of the raceway R2.

Cable may then be routed through the system which includes the one direction tee and the three raceways associated with it. It will be noted that the collars 78,78 around the fastener receiving apertures protect the cable from abrasion by contact with the heads of the various mounting fasteners F, F used to secure the fitting 10 to an associated mounting surface. The assembly is completed by positioning the covers on the respective raceways and snapping the cover 32 into assembly with the base member 30.

We claim:

1. A flat elbow/one direction tee fitting comprising a hollow generally L-shaped body having inner and outer sidewalls, said sidewalls partially defining axially elongate and angularly spaced apart first and second legs, said legs having free ends respectively defining first and second raceway receiving openings communicating with the interior of said fitting for respectively receiving end portions of first and second raceways, and knockout means on said body for breakaway separation from the remainder of said body to define a third raceway receiving opening in said remainder of said body and communicating with said interior of said body for receiving a third raceway in a first position wherein the third raceway extends from the third raceway receiving opening and in a direction of axial extent of said first leg and in a second position wherein the third raceway extends from the third raceway receiving opening and in a direction of axial extent of said second leg.

2. A flat elbow/one direction fee fitting as set forth in claim 1 wherein said inner sidewall has an arcuate configuration.

3. A flat elbow/one direction tee fitting as set forth in claim 2 wherein said inner sidewall has a center of curvature located along a line bisecting the interior angle between said first and second legs.

4. A flat elbow/one direction tee fitting as set forth in claim 1 wherein said first and second legs are disposed in generally axially perpendicular relation to each other.

5. A flat elbow/one direction tee fitting as set forth in claim 1 wherein said body includes a corner sidewall disposed in inclined relation to and extending between said outer sidewalls.

6. A flat elbow/one direction tee fitting as set forth in claim 5 wherein said knockout means comprises said corner sidewall.

7. A flat elbow/one direction tee fitting as set forth in claim 1 wherein said knockout means comprises lines of weakening on said body.

8. A flat elbow/one direction tee fitting as set forth in claim 1 wherein said body includes a base, a cover, and retaining means for releasably securing said cover in assembly with said base.

9. A flat elbow/one direction tee fitting as set forth in claim 8 wherein said retaining means is further characterized as means for releasably securing said cover in snap together assembly with said base.

10. A flat elbow/one direction tee fitting as set forth in claim 8 wherein said knockout means is defined by portions of said cover and said base.

11. A flat elbow/one direction tee fitting as set forth in claim 10 wherein said body has a corner and said knockout means is defined by said corner.

12. A flat elbow/one direction tee as set forth in claim 10 wherein said knockout means comprises lines of weakening on said cover and said base.

13. A flat elbow/one direction tee fitting as set forth in claim 11 wherein said guide means comprises said retaining means.

14. A flat elbow/one direction tee fitting as set forth in claim 8 wherein said body includes guide means for maintaining said cover in alignment with said base as said cover is moved into assembly with said base.

15. A flat elbow/one direction tee fitting comprising a hollow generally L-shaped body including a base and having a mounting surface, a cover, and latching means for releasably retaining said cover in assembly with said base, said body having inner and outer sidewalls partially defining axially elongate and angularly spaced apart first and second legs disposed in generally axially perpendicular relation to each other, said first and second legs having free ends defining first and second raceway receiving openings communicating with the interior of said body, and knockout means on said body for breakaway separation from the remainder portion of said body to define a third raceway receiving opening in said remainder of said body and communicating with the interior of said body for receiving therein an axially elongate raceway in a first position wherein the axis of the raceway extends from the third raceway receiving opening and in a direction of axial extent of said first leg and in a second position wherein the raceway extends from said third raceway receiving opening and a direction of axial extent of said second leg.

16. A flat elbow/one direction tee fitting as set forth in claim 15 wherein said sidewalls include a pair of rectilinear outer sidewalls and an inner sidewall extending arcuately between said first and second raceway receiving openings and having a center of curvature lying along a line bisecting the included angle between said first and second legs.

17. A flat elbow/one direction tee fitting as set forth in claim 15 wherein said body includes guide means for directing said maintaining said cover in alignment with said base as said cover is moved into assembly with said base.

18. A flat elbow/one direction tee fitting as set forth in claim 16 wherein said guide means comprises said latching means.

19. A fiber optic flat elbow/one direction tee fitting comprising a hollow generally L-shaped body having a corner and a pair of angularly spaced apart legs extending from said corner and terminating at free ends, each of said legs having a raceway receiving opening at its free end in communication with the interior of said body, said legs having outer sidewalls and an inner sidewall extending generally arcuately between said free ends, and knockout means at said corner for breakaway separation from the remainder of said body to define another raceway receiving opening in communication with the interior of said body.

20. A fiber optic flat elbow/one direction tee as set forth in claim 19 wherein said body has a base wall defining a mounting surface and said knockout means comprises a part of said base wall.

21. A fiber optic flat elbow/one direction tee as set forth in claim 20 wherein said knockout means comprises lines of weakening on said body.

22. A fiber optic flat elbow/one direction tee as set forth in claim 21 wherein said body includes a base and a removeable cover and said base wall comprises a part of said base.

* * * * *